United States Patent
Matthews

(10) Patent No.: US 6,845,180 B2
(45) Date of Patent: Jan. 18, 2005

(54) PREDICTING RINGING ARTIFACTS IN DIGITAL IMAGES

(75) Inventor: Kristine Elizabeth Matthews, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 599 days.

(21) Appl. No.: 09/809,828

(22) Filed: Mar. 16, 2001

(65) Prior Publication Data

US 2002/0131647 A1 Sep. 19, 2002

(51) Int. Cl.[7] .................................................. G06K 9/40
(52) U.S. Cl. ..................................... 382/268; 382/275
(58) Field of Search ................................ 382/162, 167, 382/266–275, 254, 232, 233, 248, 250–251, 260; 348/606–619; 375/240.03, 240.27–240.29, 240.11, 240.12, 240.22; 358/3.26, 426.14; 709/202

(56) References Cited

U.S. PATENT DOCUMENTS

| 5,495,538 | A | | 2/1996 | Fan ............................. 382/233 |
| 5,819,035 | A | | 10/1998 | Devaney et al. ............ 709/202 |
| 5,850,294 | A | | 12/1998 | Apostolopoulos et al. ....... 358/426.14 |
| 5,877,813 | A | | 3/1999 | Lee et al. ............... 375/240.12 |
| 5,883,983 | A | | 3/1999 | Lee et al. .................... 382/268 |
| 5,920,356 | A | | 7/1999 | Gupta et al. ................ 348/606 |
| 5,974,197 | A | | 10/1999 | Lee et al. .................... 382/268 |
| 6,115,503 | A | * | 9/2000 | Kaup .......................... 382/268 |
| 6,125,143 | A | | 9/2000 | Suzuki et al. ........... 375/240.11 |
| 6,370,279 | B1 | * | 4/2002 | Paik ........................... 382/268 |
| 6,490,008 | B1 | * | 12/2002 | Harrington .................. 348/615 |
| 6,539,060 | B1 | * | 3/2003 | Lee et al. ................. 375/240.9 |
| 6,633,683 | B1 | * | 10/2003 | Dinh et al. .................. 382/260 |
| 6,636,645 | B1 | * | 10/2003 | Yu et al. ..................... 382/268 |

FOREIGN PATENT DOCUMENTS

EP           0 680 219 A2 *  5/1995   ............ H04N/7/30

OTHER PUBLICATIONS

Moon et al., Postprocessing in Block–Based Video Coding Based on Quantization Noise Model, IEEE 0–7803–7402–9/02.*

Ji et al., Adaptive Image Contrast Enhancement Based on Human Viual Properties, IEEE 0278–0062/94, 574–585.*

Yang and Galastsanos, Removal of Compression Artifacts Using Projections Onto Convex Sets and Line Process Modeling, IEEE Transactions on Image Processing, Vil. 6, No. 10, pp. 1345–1357, Oct. 1997.

Meier, Ngan, and Crebbin, Reduction of Blocking Artifacts in Image and Video Coding, IEEE Transactions for Circuits and Systems for Video Technology, vol. 9, No. 3, pp 490–500, Apr. 1999.

Park and Lee, A Postprocessing Method for Reducing Quantization Effects in Low Bit–Rate Moving Picture Coding, IEEE Transactions on Circuits and Systems for Video Technology, vol. 9, No. 1, pp. 161–171, Feb. 1999.

* cited by examiner

Primary Examiner—Leo Boudreau
Assistant Examiner—Ishrat Sherali
(74) Attorney, Agent, or Firm—Chernoff, Vilhauer, McClung & Stenzel, LLP

(57) ABSTRACT

Ringing artifacts in digital images are predicted by determining a number of pixels of a block of pixels exhibiting luminance exceeding a luminance threshold adequate for detecting a ringing artifact and a number of these higher luminance pixels having sufficient contrast with neighbor pixels to be a likely source of a ringing artifact.

24 Claims, 4 Drawing Sheets

PREDICTING RINGING ARTIFACTS IN DIGITAL IMAGES

CROSS-REFERENCE TO RELATED APPLICATIONS

Not applicable.

BACKGROUND OF THE INVENTION

The present invention relates to postprocessing of digital images and, more particularly, to a method of predicting ringing artifacts in a decompressed digital image to facilitate postprocessing for mitigation of the artifacts.

Block-based, transform coding is commonly used to compress digital images. For example, block-based, transform coding is a feature of the JPEG (ISO 10918) standard for still images and the MPEG-2 (ISO 13818) standard related to motion video. Generally, block-based, transform coding involves subdividing an image into blocks of pixels; applying a reversible transform, such as the Discrete Cosine Transform (DCT), to the luminance and chrominance of the pixels of the blocks; quantizing the resulting transform coefficients; and coding the results. At the decoder, the process is reversed to reconstruct the image. While block-based transform coding can achieve high compression ratios, information in the original image is discarded during the compression process degrading the reconstructed image, especially if the image is part of a highly compressed video sequence with substantial motion.

When a transform coded image is reconstructed the image may include visible artifacts of the compression process. One common artifact of block-based transform coding is the "blocking" effect or "grid noise." The blocking effect is the result of the approximation of the DC transform coefficient during quantization. In quantizing the transform coefficients the encoder selects one of the available quantization parameters closest in value to the coefficient to represent the coefficient. This "rounding off" can produce pixels of visually different colors in adjacent blocks even though the corresponding pixels of the original image were nearly identical. As a result, blocks of pixels created for the transform coding process may be visible in the reconstructed image. The blocking effect becomes more pronounced as the quantization steps are coarsened to reduce the data rate. The blocking effect is a particular problem along edges or color boundaries in the image or in areas of the image that are of relatively uniform color.

In addition, the reconstructed image may exhibit "staircase noise," a term descriptive of the appearance of an edge in the reconstructed image. Staircase noise is the result of enhancement of the blocking effect for blocks that bridge an edge in the image.

A third compression artifact of reconstructed digital images is the "ringing" artifact or "mosquito noise." Ringing produces jagged or fuzzy lines in the vicinity of sharp edges in the image. For example, text includes many sharp edges and is a prime location for ringing artifacts. Ringing noise in video is visible as local flickering near edges. Ringing is the result of noise produced by coarse quantization of higher frequency transform coefficients and the lack of correlation between pixels on either side of an edge. While the blocking effect is the predominant compression artifact in severely compressed images, ringing is typically the most visible artifact at lower compression ratios.

Compression artifacts can be annoying to viewers of the reconstructed image and digital images are commonly further processed after decompression or postprocessed to mitigate the effects of artifacts in the reconstructed image. Some postprocessing methods attempt to recover the original image from a combination of the decompressed image data and information related to the smoothness properties of the image before compression. These methods require information in addition to the information necessary to reconstruct the image requiring higher rates of data transmission. The blocking effect is often addressed by filtering the pixels at the edges of block boundaries to smooth the transition between blocks. However, filtering at the block boundaries usually has little effect on ringing artifacts which tend to lie along edges in the image, but are not transmitted across block boundaries. Filtering may be applied to edges in the image to reduce ringing artifacts, but edge detection is computationally expensive and filtering blurs the edges reducing the sharpness of the image. In general, postprocessing methods are complex, often iterative and time consuming, and can degrade the sharpness of the image. These factors limit the usefulness of many postprocessing methods as processes to be applied wholesale to decompressed images, especially in real time video applications. However, if areas of an image that are likely to produce a ringing artifact could be identified, a postprocessing method could be selectively applied to only limited areas of the image, reducing the impact on image quality and the time and computational facilities necessary for postprocessing.

What is desired, therefore, is a method of identifying areas of a reconstructed image that are likely to exhibit a ringing artifact.

DETAILED DESCRIPTION OF THE INVENTION

Block-based, transform coding is widely used for digital imaging coding and is an underlying process of the JPEG (ISO 10918) still image coding standard and the MPEG-2 (ISO 13818) video coding standard. However, it is well known that block-based, transform coding can produce visually objectionable artifacts in the reconstructed image. Typical artifacts include the blocking effect where the blocks of pixels utilized in the transform coding are visible in the reconstructed image. The blocking effect can be enhanced at an edge to produce a staircase appearance of blocks in the vicinity of the edge. A third artifact of compression is the ringing effect or mosquito noise in the vicinity of sharp edges in an image. Ringing noise comprises jagged or fuzzy lines in the vicinity of strong edges in the reconstructed image. Ringing artifacts are common around text because text includes many sharp edges.

Postprocessing is commonly applied to digital images to mitigate the effects of compression artifacts. However, applying postprocessing to an entire image is undesirable because generally postprocessing methods are complex requiring substantial processing time and power and postprocessing tends to blur the image. The present inventor concluded that postprocessing for ringing artifacts could be more effectively applied if likely locations of those artifacts in the reconstructed image could be predicted. The ringing artifact prediction method of the present invention is described herein in terms of the MPEG-2 block-based, transform coding process but can be applied to any raster image.

Figure 1:
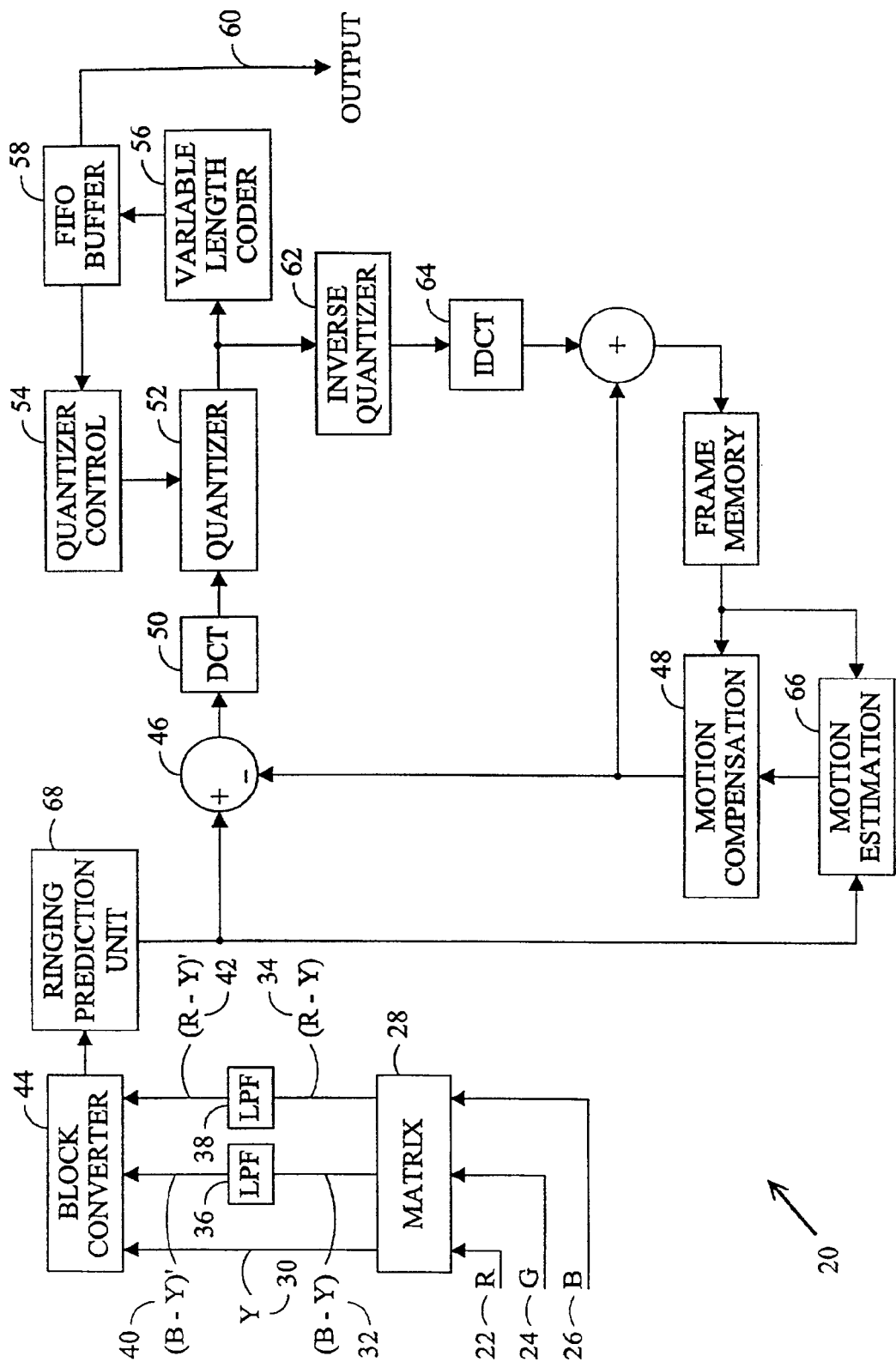
FIG. 1 is a block diagram of a block-based transform video encoder.

FIG. 1 is a block diagram of an MPEG-2 type video encoder 20. Red 22, green 24, and blue 26 video signals from a camera or other video source are introduced to the encoder 20 in raster scan order. These signals are processed in a color matrix circuit 28 to generate a luminance signal (Y) 30 and two color difference (B-Y 32 and R-Y 34) or chrominance signals. The color difference signals 32 and 34 are, respectively, processed in low pass filters 36 and 38 to produce signals (B-Y)' 40 and (R-Y)' 42 having one-half the spatial resolution of the luminance signal in each of the horizontal and vertical directions.

Figure 2:
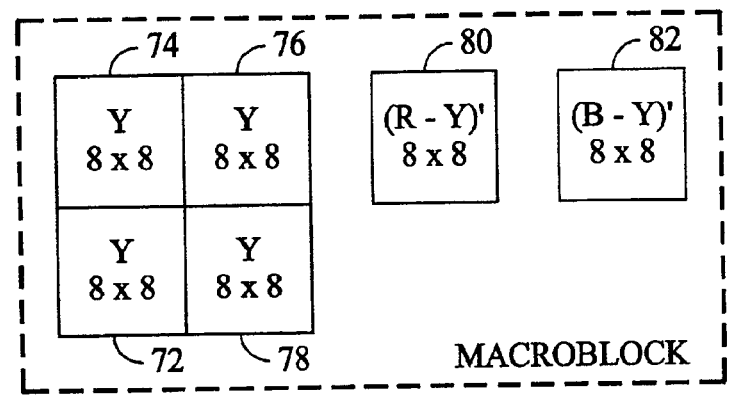
FIG. 2 is a schematic illustration of a macroblock data structure used in block-based transform coding.

The luminance signal 30 and the two chrominance signals 40 and 42 are input to a block converter 44. The block converter 44 converts the signals from raster scan format to a block format. In the block format an image comprising a frame of video is represented as a collection of blocks of pixels. Typically, each block comprises an 8×8 matrix of 64 contiguous pixels. The block converter 44 combines several contiguous pixel blocks into a data structure known as a macro block. FIG. 2 schematically illustrates an exemplary macroblock 70 data structure containing four sixty-four pixel luminance blocks 72, 74, 76, and 78 and two spatially corresponding, sixty-four pixel color difference blocks 80 and 82. Typically, each luminance and color difference value of each pixel is represented by an eight bit digital number.

The block converter 44 inputs these pixel values, one block at a time, to a subtracter 46. The subtracter 46 subtracts each block of a macroblock provided by a motion compensation unit 48 from a corresponding block of a macroblock input by the block converter 44. The subtracter 46 generates blocks of data representing a motion predictive, differentially-coded macroblock.

The blocks generated by the subtracter 46 are input to a Discrete Cosine Transform (DCT) processor 50. The DCT processor 50 applies a reversible discrete cosine transform to each of the six blocks of differential pixel values to convert them into sixty-four DCT coefficients. The first of these coefficients represents the zero spatial frequency (DC) component of the pixels in the block and the remaining coefficients represent successively higher frequency (AC) spatial frequency components. Each block of transform coefficients is then rearranged into a linear stream of sixty-four coefficients using a zigzag scan.

The coefficients produced by the DCT processor 50 are input to a quantizer 52 that converts each coefficient to one of a limited number of binary numbers. A larger number of bits or finer quantization is often applied to coefficients representing lower frequencies because the eye is more sensitive to image components with lower spatial frequencies than it is to higher frequency image components. Variable quantization is typically performed by dividing each coefficient in the block by a different value which is proportional to the frequency of the coefficient. An array with these values may be transmitted with the image to allow the signal to be dequantized at the receiver. In addition, the number of bits assigned to a coefficient may be changed from time to time in response to a quantizer control 54.

The quantizer 52 produces a stream of digital values that are encoded by a variable length encoder 56. The variable length encoder typically applies a run-length, Huffman code to the data stream. The data stream is input to a buffer 58 that stores the data so that it can be passed to the output 60 at a specific fixed rate. Typically, the quantizer controller 54 monitors the quantity of data in the buffer 58 and adjusts the resolution of the quantizer 52 to maintain the proper output data rate. As the buffer 58 fills, the quantizer controller 54 coarsens the resolution of the quantizer 52 to reduce the data rate to the buffer 58. As the quantization is coarsened, the quantization error and the presence of compression artifacts increase. Compression artifacts are primarily a function of the coarseness of the quantization of the transform coefficients.

The output of the quantizer 52 is also input to an inverse quantizer 62 and an inverse DCT transformer 64. The output of the inverse DCT transformer 64 is sent to motion estimation 66 and motion compensation 48 units which provide input for the subtracter 46.

Figure 3:
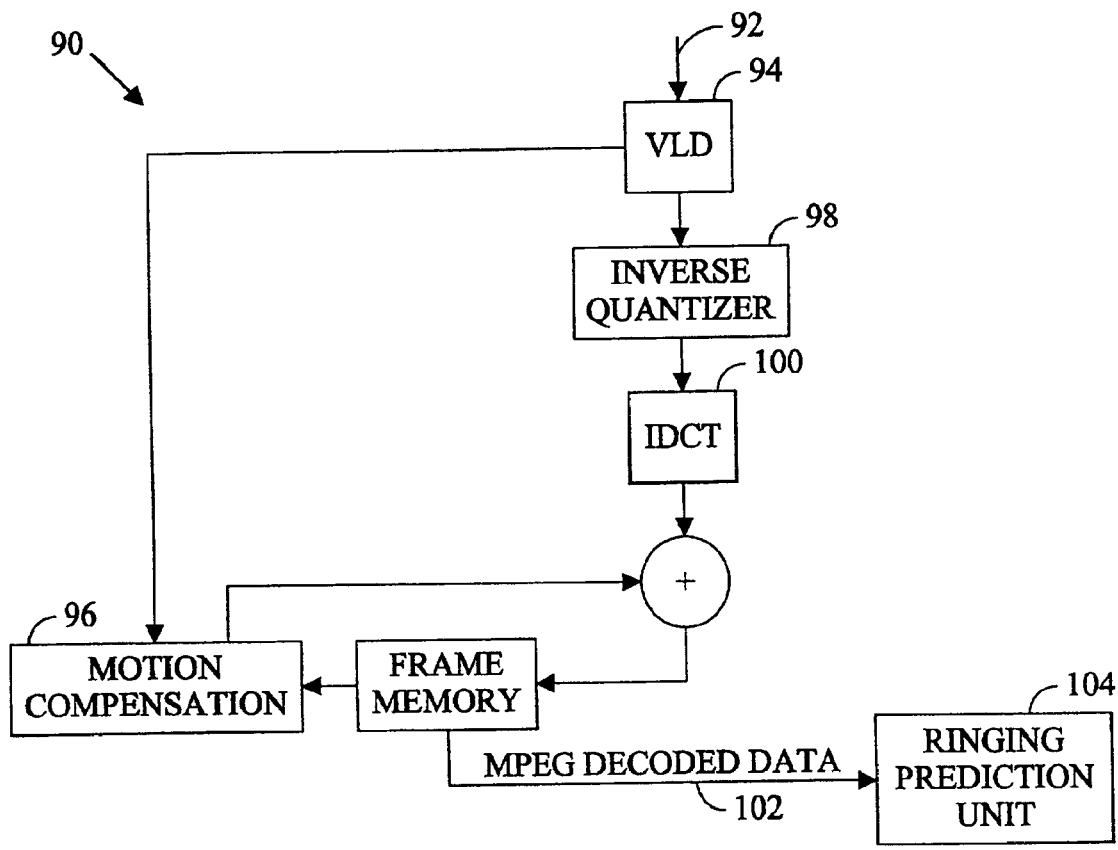
FIG. 3 is a block diagram of a decoder for transform coded video.

The output 60 of the encoder 20 is transmitted to a receiver for decoding and reconstruction in a decoder 90 such as illustrated in FIG. 3. In the decoder 90 the encoding process is reversed with the transmitted data 92 first being input to a variable length decoder 94 to decode the run-length Huffman code. The variable length decoder 94 also extracts encoded motion vector data for the motion compensation unit 96. The fixed length code blocks are input to an inverse quantizer 98 that reverses the operation of the quantizer 52 of the encoder 20 to produce approximate DCT coefficients for each block of the encoded image. The blocks of coefficients are input to an inverse discrete cosine transform (IDCT) processor 100. Inverse transformation of the transform coefficients produces reconstructed blocks of image pixels or motion compensated differentially encoded pixel values.

Ringing artifacts are the result of quantization error, particularly for coefficients representing higher spatial frequencies. Ringing is most likely to occur along strong edges in an image and is common in text because of the prevalence of strong edges. However, ringing artifacts generally manifest as fuzzy, gray lines in the vicinity of an edge and are detectable only if the surrounding pixels have relatively high luminance. If the pixels in the area of the ringing artifact are of low luminance, the lines will be difficult to detect. Further, texture in the area of the ringing artifact tends to hide the artifact. The inventor concluded that ringing artifacts could be predicted by identifying areas of an image exhibiting relatively high luminance values and sharply contrasting luminance.

Figure 4:
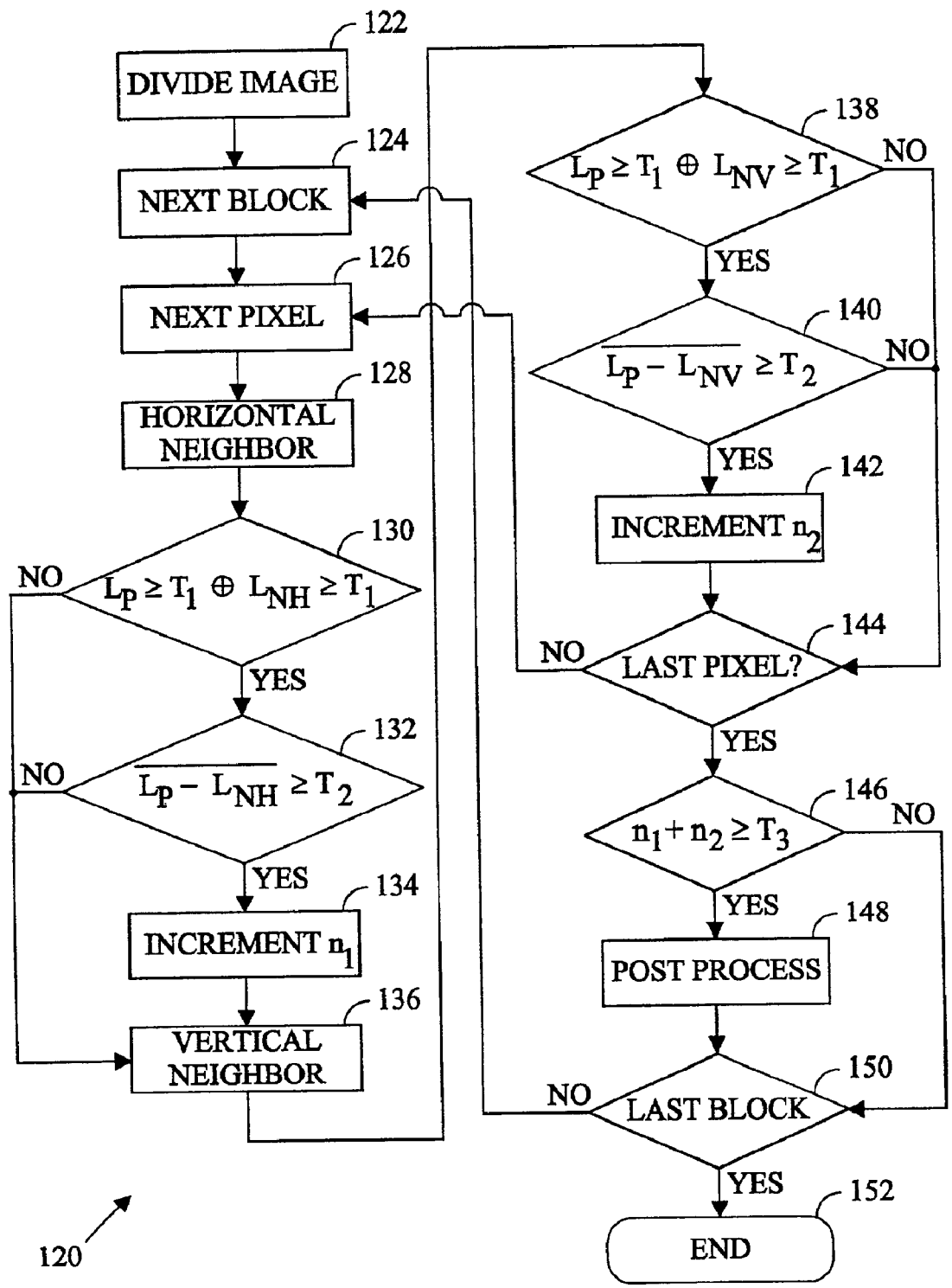
FIG. 4 is a flow diagram of a method of ringing prediction of the present invention.
Figure 5:
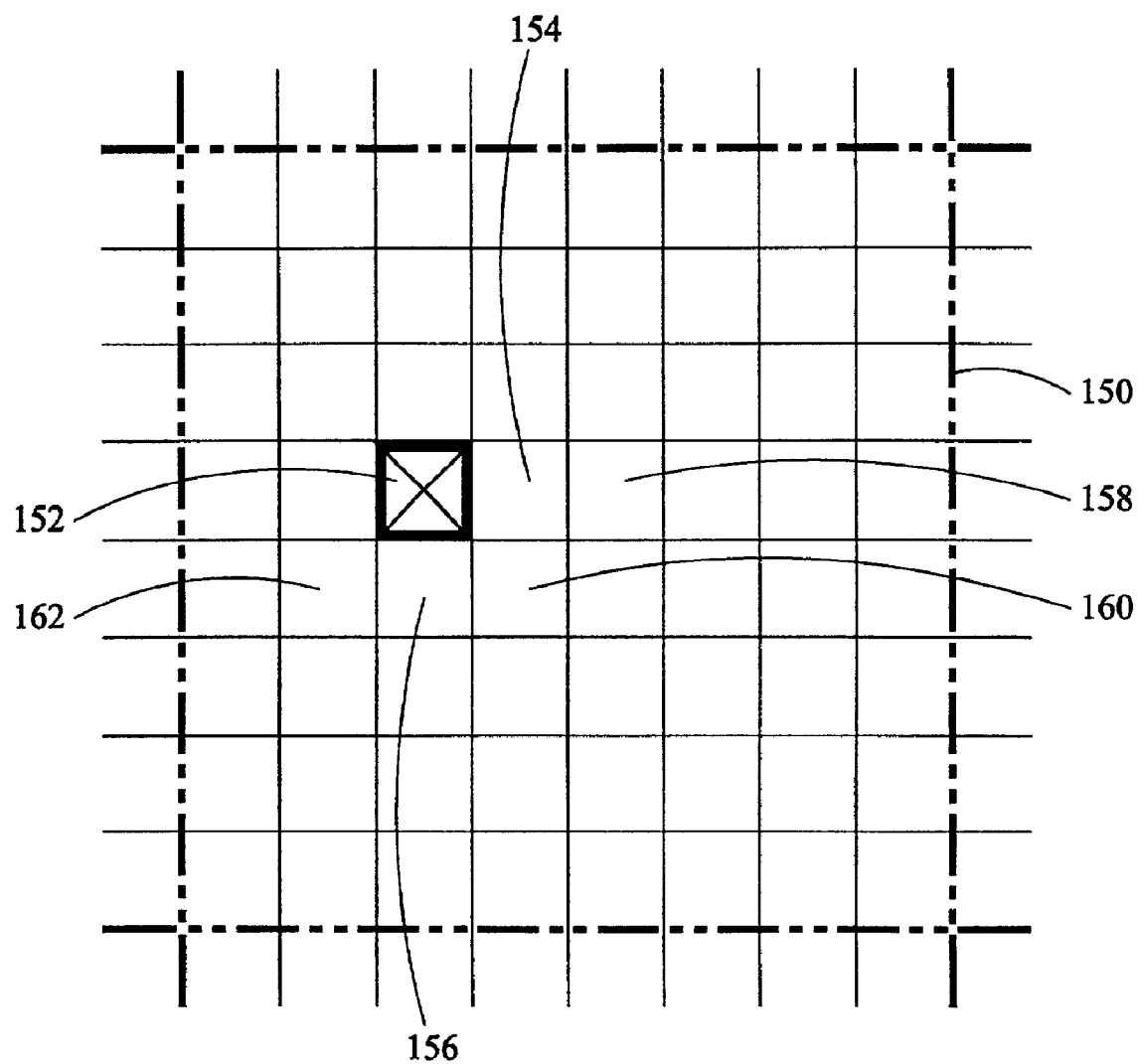
FIG. 5 is a schematic representation of a block of image pixels.

Referring to FIG. 4, in the ringing artifact prediction method of the present invention 120 areas of an image likely to produce ringing artifacts are identified by comparing the luminance of a first or subject pixel and its neighbors to a threshold luminance value and by comparing the difference between the luminance of the first pixel and its neighbors to a threshold luminance difference. A block of pixels comprising a substantial number of pixels of high luminance and pixel pairs of sharply contrasting luminance is likely to be a location of ringing artifact and an appropriate target for postprocessing. The pixels of the image are divided into blocks 122. Since ringing artifacts do not manifest across the boundaries of the blocks used in compressing the image, the blocks used for ringing prediction are most conveniently the same as those used for compression. For example, if luminance (Y) and chrominance (U and V) channels are to be compressed according to the JPEG standard and if the chrominance channels are not subsampled the compression block and the pixel block for ringing prediction comprises 8×8 pixels. However, if the chrominance channels are subsampled, the appropriate block size is 16 pixels by 16 pixels. The luminance data for the pixels of the block can be obtained by a ringing prediction unit 68 at the output of block converter 44 of the encoder 20 if prediction is to be applied to original image. Applying prediction to the image before compression requires that additional data be transmitted with the image identifying blocks in which ringing is predicted. On the other hand, the method can be applied to the reconstructed image by a ringing prediction unit 104 at the output 102 of the decoder 90. Predicting artifacts from the reconstructed image eliminates the need to transmit additional data with the image, but noise in the reconstructed image may cause ringing to be predicted for a larger number of blocks. FIG. 5 schematically illustrates the pixels of an 8×8 pixel block 150 that is a subdivision of a larger image.

The blocks of the image 124 and the pixels of each block 126 and are examined serially. For example, following examination of the neighborhood of a an exemplary subject pixel 152, the method may examine the neighborhood of the contiguous, horizontally neighboring pixel 154. The luminance value of a first or subject pixel (for example pixel 152) is determined 126. Likewise, the luminance of a horizontally neighboring pixel (for example, pixel 154) is determined 128. If the luminance of either the subject pixel or its horizontal neighbor exceeds a first threshold luminance ($T_1$) 130, the pixels have adequate luminance to make a ringing artifact visually detectable. If the one of the pixels has sufficient luminance to make a ringing artifact objectionable, the absolute value of the difference between the luminance of the subject pixel 152 and its horizontal neighbor 154 is compared to a luminance difference threshold ($T_2$) 132. An edge strong enough to produce ringing is implied if the luminance difference equals or exceeds the luminance difference threshold ($T_2$). If the luminance of the subject pixel or its horizontal neighbor equals or exceeds the luminance threshold ($T_1$) 130 and the absolute difference of between the luminance of the two pixels equals or exceeds the luminance difference threshold ($T_2$) 132, a first pixel count ($n_1$) is incremented 134.

After testing a pixel 152 with its horizontal neighbor, a vertically neighboring pixel (for example, pixel 156) is similarly tested 136. If the luminance of the subject pixel 152 or the luminance of the vertically neighboring pixel 154 equals or exceeds the luminance threshold ($T_1$) 138, the difference in luminance of the two vertically neighboring pixels is compared to the luminance difference threshold ($T_2$) 140. If one of the two pixels is sufficiently luminous and the differences in their luminance equals or exceeds the luminance difference threshold ($T_2$), the pixel is located in an area likely to include an objectionable ringing artifact and a second count ($n_2$) is incremented 142.

As described above, the method compares pixels that are horizontally and vertically displaced from the first or subject pixel 152. Pixels diagonally neighboring the first pixel 152, for example pixels 160 or 162, could be used in the evaluation.

If the subject pixel is not the last pixel in the block 144, the luminance of the next pixel is read out for testing 126. Typically, the pixels are evaluated serially in raster scan fashion for first pixels and neighboring pixels within the block. Ringing artifacts are not transmitted across block boundaries, so examination of the boundary pixels is not required. However, the next pixel 126 evaluated may be a pixel other than a contiguous neighbor (for example, pixel 158). Likewise, the next pixel examined might be a horizontal neighbor (for example, pixel 156) or a diagonally neighboring pixel (for example, pixel 160).

If the subject pixel is the last pixel of the block 144, the sum of the counts of pixels ($n_1$ and $n_2$) in the block meeting the luminance and luminance difference tests is compared to a pixel count threshold ($T_3$) 146. If the sum of the numbers of pixels exceeds the pixel count threshold ($T_3$) the block is identified as a candidate for postprocessing 148. The thresholds of luminance for artifact detection, luminance difference, and numbers of pixels can be adjusted to accommodate the tolerance of the particular system to visible artifacts. For example, if the compression algorithm is more likely to produce artifacts in one direction, the numbers of pixels produced by one of the horizontal or vertical comparisons can be weighted by multiplying $n_1$ or $n_2$ by a value, as appropriate.

If the block of pixels to which the subject pixel belongs is not the last block of the image 150, the next block is selected for evaluation 124. If the block under consideration is the last block, the ringing prediction is concluded 152.

The method of the present invention improves postprocessing efficiency by identifying the areas of the image that are likely to include ringing artifacts and therefore would benefit from postprocessing. Postprocessing can be applied to only those areas of the image requiring attention reducing the processing time, resources required for processing, and limiting the degradation of the image that can result from filtering or other compression artifact mitigation methods.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method of predicting a ringing artifact in an image, said method comprising the steps of:
   (a) determining a first number of pixels of a pixel block having at least one of a first pixel luminance and a neighboring pixel luminance exceeding a first threshold;
   (b) determining a second number of pixels comprising pixels of said first number having a relationship between said first pixel luminance and said neighboring pixel luminance exceeding a second threshold; and
   (c) predicting a ringing artifact for said block of pixels if a relationship of said second number of pixels exceeds a third threshold.

2. The method of claim 1 wherein said first pixel luminance relationship to said neighboring pixel luminance comprises a difference between said luminance of said first pixel and said luminance of said neighboring pixel.

3. The method of claim 1 wherein said first pixel luminance relationship to said neighboring pixel luminance comprises an absolute value of a difference between said luminance of said first pixel and said luminance of said neighboring pixel.

4. The method of claim 1 wherein said neighboring pixel is a pixel horizontally displaced relative to said first pixel.

5. The method of claim 1 wherein said neighboring pixel is a pixel vertically displaced relative to said first pixel.

6. The method of claim 1 wherein said neighboring pixel Is a pixel diagonally displaced relative to said first pixel.

7. The method of claim 1 further comprising the step of dividing said image into a plurality of blocks of contiguous pixels.

8. The method of claim 1 wherein said first pixel and said neighboring pixel are pixels of a reconstructed transform coded image.

9. A method of predicting a ringing artifact in an image, said method comprising the steps of:
(a) determining a first number of pixels of a pixel block having at least one of a first pixel luminance and a first neighboring pixel luminance exceeding a first threshold;
(b) determining a second number of pixels comprising pixels of said first number having a relationship between said first pixel luminance and said first neighboring pixel luminance exceeding a second threshold;
(c) determining a third number of pixels of said block having at least one of said first pixel luminance and a second neighboring pixel luminance exceeding a third threshold;
(d) determining a fourth number of pixels comprising pixels of said third number having a relationship between said first pixel luminance and said second neighboring pixel luminance exceeding a fourth threshold; and
(e) predicting a ringing artifact for said block of pixels if a relationship of said second and fourth numbers of pixels at least equals a pixel number threshold.

10. The method of claim 9 wherein at least one of said relationships of said first pixel luminance to said first and said second neighboring pixel luminance comprises a difference between said luminance of said first pixel and said luminance of said neighboring pixel.

11. The method of claim 9 wherein at least one of said relationships of said first pixel luminance to said first and said second neighboring pixel luminance comprises an absolute value of a difference between said luminance of said first pixel and said luminance of said neighboring pixel.

12. The method of claim 9 wherein said relationship of said second and fourth numbers of pixels comprises a sum.

13. The method of claim 9 wherein said relationship of said second and fourth numbers of pixels comprises a sum of said second number of pixels and a multiple of said fourth number of pixels.

14. The method of claim 9 wherein said first neighboring pixel is horizontally displaced relative to said first pixel and said second neighboring pixel is vertically displaced relative to said first pixel.

15. The method of claim 9 further comprising the step of dividing said image into a plurality of blocks of contiguous pixels.

16. The method of claim 9 wherein said first pixel and said first and said second neighboring pixels are pixels of a reconstructed transform coded image.

17. A method of predicting a location of a ringing artifact in a transform coded image, said method comprising the steps of:
(a) dividing said image into a plurality of blocks of contiguous pixels;
(b) determining a first number of pixels of a block having at least one of a first pixel luminance and a horizontally neighboring pixel luminance exceeding a first threshold;
(c) determining a second number of pixels comprising pixels of said first number having a luminance difference between said first pixel and said horizontally neighboring pixel exceeding a second threshold;
(d) determining a third number of pixels of said block having at least one of said first pixel luminance and a vertically neighboring pixel luminance exceeding said first threshold;
(e) determining a fourth number of pixels comprising pixels of said third number having a luminance difference between said first pixel and said vertically neighboring pixel exceeding said second threshold; and
(f) predicting a ringing artifact for said block of pixels if a relationship of said second and fourth numbers of pixels at least equals a third threshold.

18. The method of claim 17 wherein said horizontally neighboring pixel is a pixel horizontally contiguous to said first pixel.

19. The method of claim 17 wherein said horizontally neighboring pixel is a pixel horizontally contiguous to said first pixel and included in said block.

20. The method of claim 17 wherein said vertically neighboring pixel is a pixel vertically contiguous to said first pixel.

21. The method of claim 17 wherein said vertically neighboring pixel is a pixel vertically contiguous to said first pixel and included in said block.

22. The method of claim 17 wherein said relationship of said second and said fourth numbers of pixels is a sum.

23. The method of claim 19 wherein said relationship of said second and said fourth numbers of pixels is a sum of said second number of pixels and multiple of a sum of said fourth number of pixels.

24. The method of claim 17 wherein said first pixel and said horizontally and said vertically neighboring pixels are pixels of a reconstructed transform coded image.

* * * * *

UNITED STATES PATENT AND TRADEMARK OFFICE
CERTIFICATE OF CORRECTION

PATENT NO. : 6,845,180 B2  Page 1 of 1
APPLICATION NO. : 09/809828
DATED : January 18, 2005
INVENTOR(S) : Kristine Matthews It is certified that error appears in the above-identified patent and that said Letters Patent is hereby corrected as shown below:

Col. 5, line 20
Change "each block 126 and are" to read --each block 126 are--.

Col. 5, line 21
Change "neighborhood of a an exemplary" to read --neighborhood of an exemplary--.

Col. 6, line 67
Change "Is a pixel diagonally" to read --is a pixel diagonally--.

Signed and Sealed this

First Day of May, 2007

JON W. DUDAS
*Director of the United States Patent and Trademark Office*